United States Patent [19]
Gilbert

[11] 4,185,366
[45] Jan. 29, 1980

[54] SPINDLE DRIVES FOR MULTI SPINDLE LATHES

[75] Inventor: Harold J. Gilbert, Coventry, England

[73] Assignee: Wickman Machine Tool Sales Ltd., Coventry, England

[21] Appl. No.: 926,752

[22] Filed: Jul. 21, 1978

Related U.S. Application Data

[63] Continuation of Ser. No. 771,973, Feb. 25, 1977, abandoned, which is a continuation of Ser. No. 528,773, Dec. 2, 1974, abandoned.

[30] Foreign Application Priority Data

Dec. 6, 1973 [GB] United Kingdom ............... 56565/73

[51] Int. Cl.² ................................................ B23B 3/18
[52] U.S. Cl. .................... 29/35.5; 29/37 R; 29/38 B; 82/3; 192/84 AA
[58] Field of Search .................... 29/35.5, 37 R, 38 B; 82/3; 74/850, 813 C; 192/18 B, 84 AA

[56] References Cited

U.S. PATENT DOCUMENTS

| | | | |
|---|---|---|---|
| 808,226 | 12/1905 | Anderson | 192/84 AA |
| 854,107 | 5/1907 | Pick | 192/84 AA |
| 2,848,085 | 8/1958 | Mannaioni | 192/18 B |
| 3,404,583 | 10/1968 | Jacoby | 29/37 X |
| 3,718,211 | 2/1973 | Schubert et al. | 192/84 AA X |
| 3,722,048 | 3/1973 | Schubert | 209/37 R |
| 3,828,901 | 8/1974 | Flueckiger | 82/3 |

FOREIGN PATENT DOCUMENTS 533260 2/1941 United Kingdom ............... 192/84 AA

*Primary Examiner*—William R. Briggs
*Attorney, Agent, or Firm*—Holman & Stern

[57] ABSTRACT

A spindle drive for a multi spindle lathe incorporating electrically operable clutch mechanisms to engage drive to the spindles, each clutch mechanism having a part fixed to the spindle to be driven, and electromagnetic means mounted in a ring secured to the spindle mounting drum and clutch plates actuated by the electromagnetic means.

5 Claims, 6 Drawing Figures

SPINDLE DRIVES FOR MULTI SPINDLE LATHES

This is a continuation of Application Ser. No. 771,973, filed Feb. 25, 1977 which in turn is a continuation of Application Ser. No. 528,773, filed Dec. 2, 1974, now both abandoned.

FIELD OF THE INVENTION

This invention relates to multi-spindle automatic lathes in which the spindles are rotated in an indexable spindle drum by gearing, which however, is engaged and disengaged from the spindles by means of clutch mechanisms.

SUMMARY OF THE INVENTION

It is the object of the invention to provide a convenient means for controlling the actuation of the clutch mechanisms for the spindles without interfering with indexing of the spindle drum.

According to the present invention a spindle drive for a multi-spindle lathe incorporates electrically operable clutch mechanisms, whereby drive to the spindles can be engaged, each clutch mechanism comprising a part fixed with respect to the spindle it is to drive, a part fixed with respect to a drive member and electromagnetic means mounted in a ring secured to a drum in which the spindles are rotatably mounted, said electromagnetic means being actuable to engage or disengage clutch plates carried on said parts respectively.

The invention will now be described by way of example with reference to the accompanying drawings in which:

DESCRIPTION OF PREFERRED EMBODIMENTS

Figure 1:
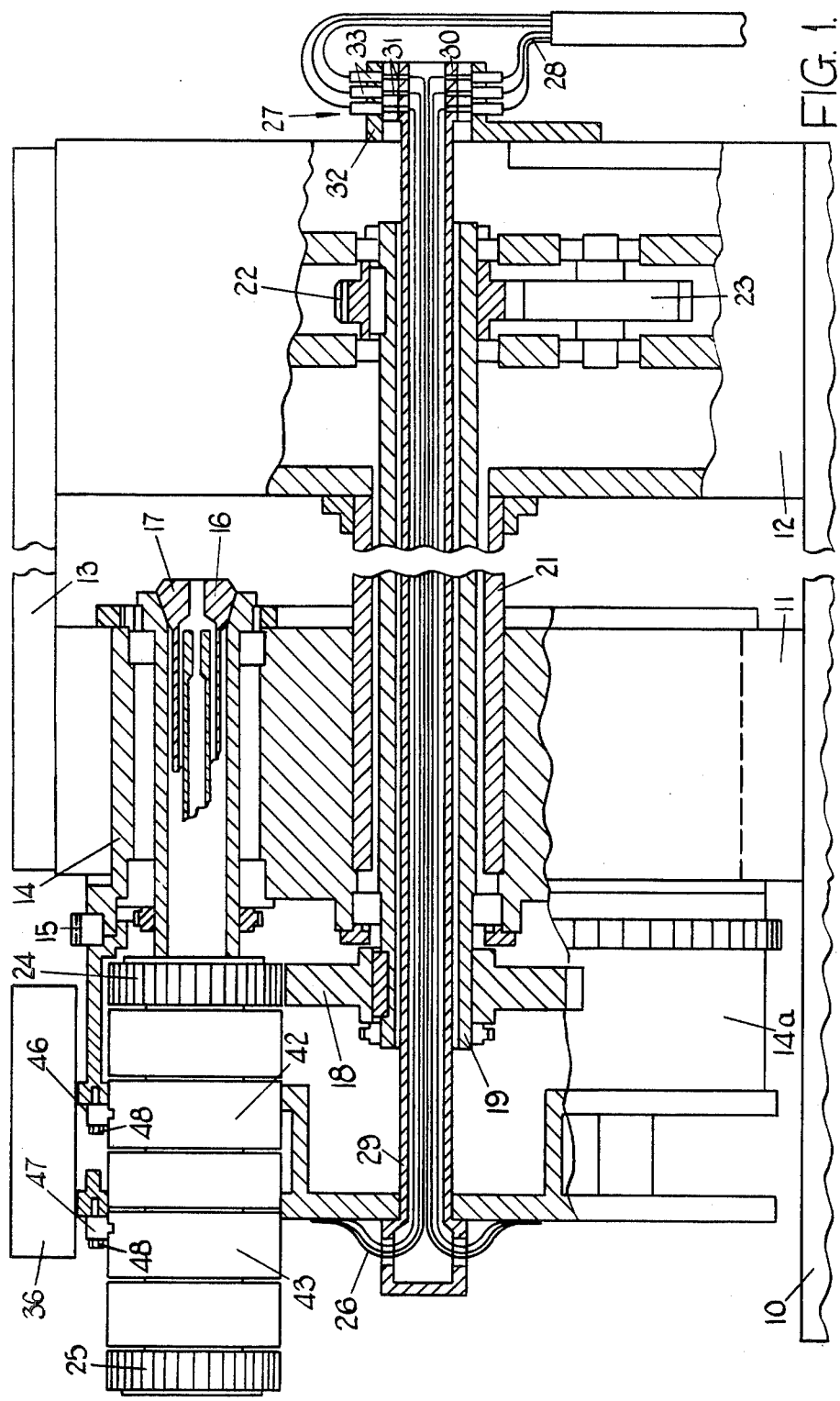
FIG. 1 is a side elevation view partly in section of a multi-spindle lathe incorporating the present invention.
Figure 3:
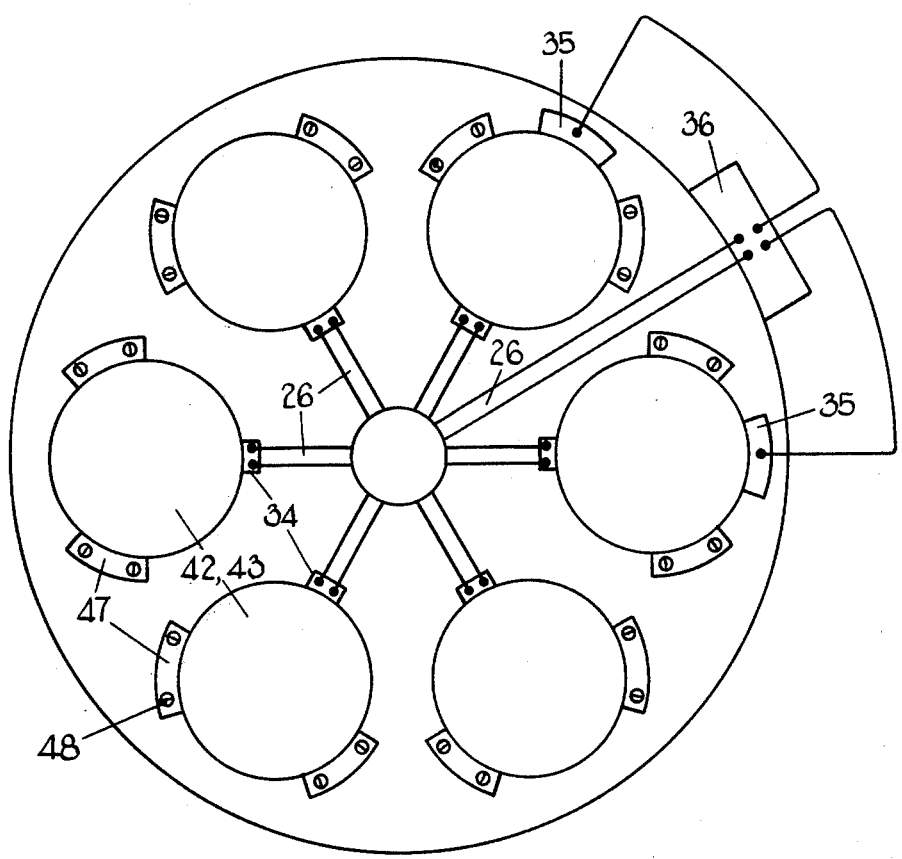
FIG. 3 is a simplified end elevation view of the indexable spindle drum of the lathe.

With reference to the FIGS. 1 and 3, the lathe is shown as comprising a base 10 on which are mounted a pair of spaced superstructures 11 and 12 connected by a bridge 13. In the superstructure 11 is mounted an indexable spindle drum 14 to which is fixed a drum extension 14a. The drum 14 and its extension 14a are provided with means for indexing about a central axis, said means, not being shown, but engaging on a toothed ring 15 mounted on the exterior of the drum 14.

The drum 14 has journalled in it a plurality (in this case six) work spindles indicated generally at 16. The spindles 16 have respective workpiece gripping arrangements indicated generally at 17 which are actuated by mechanisms (not illustrated).

To rotate the work spindle 16 in the indexable drum 14, there is provided gearing, some of which however have been omitted from the drawing for clarity. This gearing provides two alternative speeds of rotation for each of the work spindles 16 and there is also provided brake means for holding the work spindle stationary, and if required, in a selected angular position.

The gearing includes a gear 18 mounted centrally within the drum extension 14a upon a hollow shaft 19 which extends right through the indexable drum 14, and across the gap between the two superstructures 11 and 12. A stationary shroud tube 21 encloses this hollow shaft 19 over part of its length and including that part extending across the gap between the superstructures 11 and 12.

Within the superstructure 12 the hollow shaft 19 carries a gear 22 meshing with another gear 23 which is driven through a gear box by a drive motor for the lathe.

The gears 24 and 25 mounted on the work spindles 16 provide two speeds. The gear 18 meshes with each gear 24 on the workspindles to provide one drive speed and a further train of gears driven by the hollow shaft 19 engaging the gear 25 provides an alternative drive; this latter train of gears is not illustrated.

Figure 5:
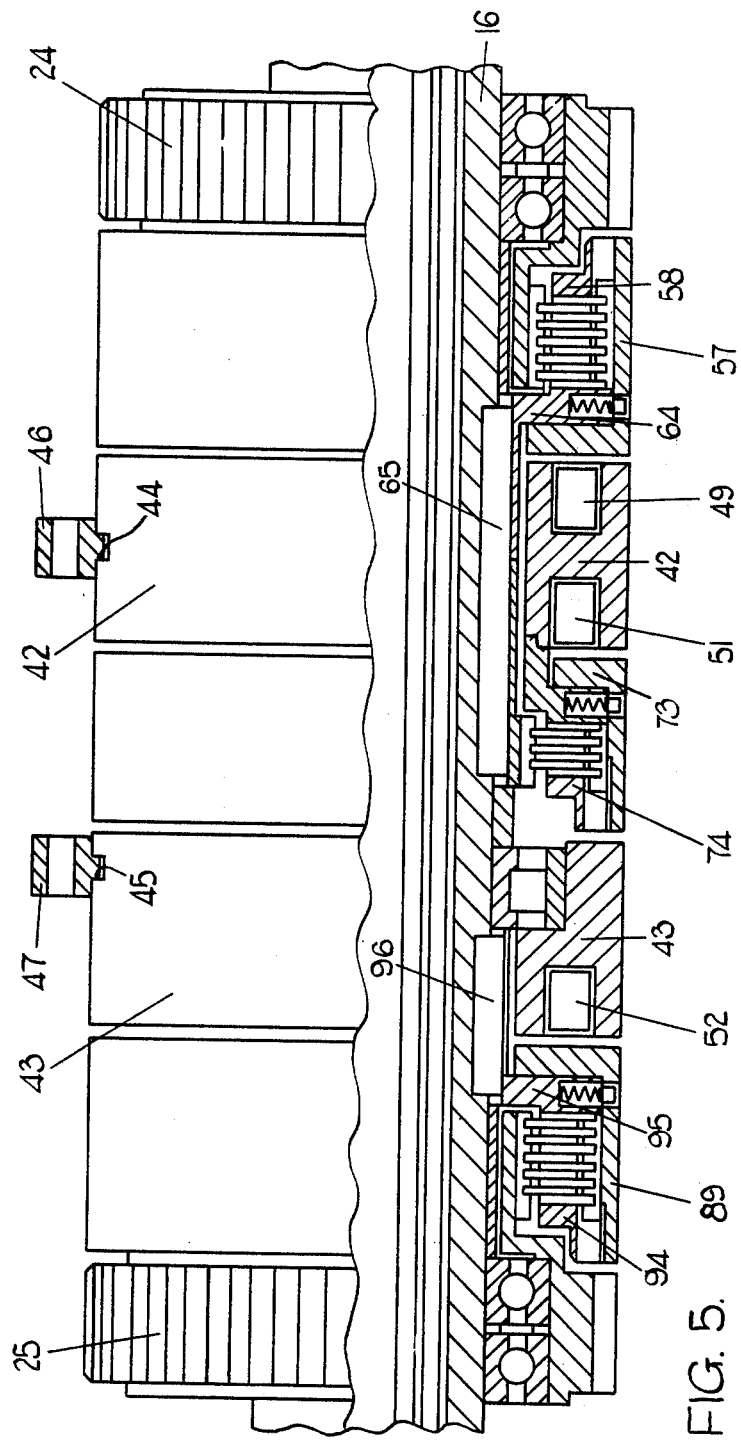
FIG. 5 is a side elevation view, partly in section, of one of the work spindle drive mechanisms of the lathe on a larger scale.
Figure 6:
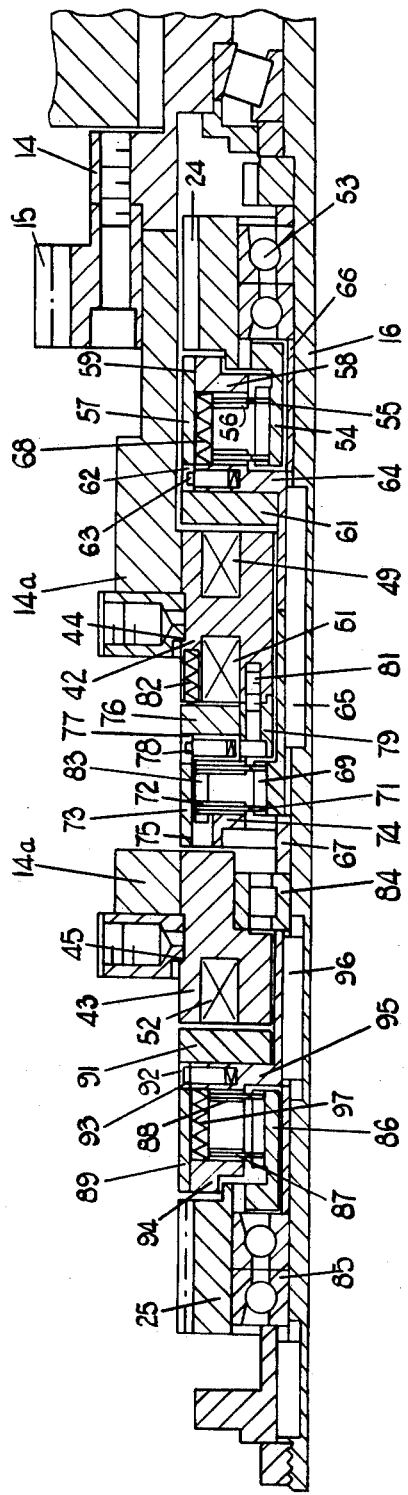
FIG. 6 is a similar view to FIG. 5 but showing more detail and being on a substantially larger scale.

To connect either of the gears 24,25 with its associated work spindle 16, clutch mechanisms are provided; these are illustrated in more detail in FIGS. 5 and 6. Furthermore, between these clutch mechanisms is brake means for arresting rotation of the work spindles 16 respectively.

The clutch mechanisms and said brake means are electrically operable, as will be described. To provide electrical connection between all the clutch mechanisms and brake means and a source of electrical supply, there is provided wiring 26 which is rotatable with the drum 14 and its extension 14a and a rotary electrical distributor 27 to which fixed wiring 28 is connected; the fixed wiring 28 leads to the source of electrical supply which is, however, not shown.

The wiring 26 between the respective clutch mechanisms and brake means and the rotary electrical distributor 27 is housed within a tube 29 fixed at one end to the drum extension 14a and thus rotatable therewith.

The tube 29 extends right through the superstructures 11 and 12 and the rotary electrical distributor 27 is mounted at the end of the superstructure 12 at the end of the machine.

Figure 2:
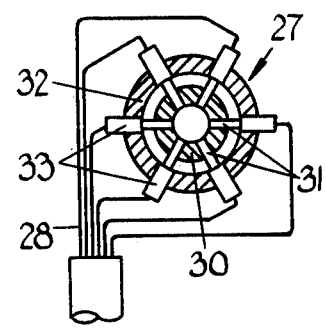
FIG. 2 is a fragmentary end elevation view showing the rotary electrical distributor.

The rotary electrical distributor 27, which is illustrated also in FIG. 2, comprises a sleeve 30 connected to the end of the tube 29 carrying respective spring loaded radially extended electrical connectors 31 to the inner end of which the wiring 26 is connected.

Surrounding the sleeve 30 is a ring 32 fixed to the superstructure 12 of the lathe; in this are carried a number of electrical connectors 33 engageable with respective connectors 31 in the sleeve 30; to which the connectors 33 the fixed wiring 28 is attached. The connectors 31 and 33 are equal in number and in spacing but indexing of the drum 14 together with the tube 29 changes the electrical connection.

The source of electrical supply connected to the fixed wiring 28 incorporates a control for selectively actuating the clutch mechanisms and brake moans are required in accordance with the operating cycle of the lathe.

FIG. 3 illustrates two alternative means for connecting the wiring 26 with the respective clutch mechanisms and brake means. One arrangement illustrated in FIG. 3 shows terminal blocks 34 mounted on the clutch bodies (to be described) of the associated work spindles. An alternative arrangement which is also shown in FIG. 3 shows terminal blocks 35 mounted on the outside of two of the clutch bodies. They would also be furnished on the other clutch bodies. These terminal blocks are connected through a further terminal block 36 mounted on the outside of the spindle drum extension 14a to which the wiring 26 is led.

Figure 4:
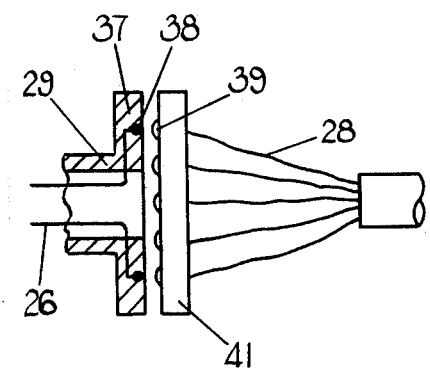
FIG. 4 is a fragmentary view showing an alternative form of rotary electrical distributor.

FIG. 4 illustrates an alternative form of rotary electrical distributor to replace that indicated at 27 in FIGS. 1 and 2. This comprises a face plate 37 mounted on the end of the tube 29 containing the wiring 26; in the face plate are studs 38 engageable with respective spring loaded studs 39 on a plate 41 fixed (in a manner not illustrated) to the superstructure 12 on the lathe. Although only five studs are shown there may be up to eighty used in practice.

The fixed wiring 28 is connected to said plate 41 into the spring loaded stud connectors 39 respectively. As the tube 29 is indexed in unison with the spindle drum 14, the electrical connections are changed in a manner similar to the rotary electrical distributor of FIGS. 1 and 2.

FIGS. 5 and 6 illustrate the clutch mechanisms and brake means on one of the work spindles 16. There are two rings 42, 43 which are fixed to the drum extension 14a. On the external surface of each such ring are formed grooves 44, 45 in which engage respective locking members 46, 47 which are also shown in FIGS. 1 and 3. These locking members are connected by belts 48 to respective spaced portions of the drum extension 14a. The locking members 47 are arranged in pairs as indicated in FIG. 3 and they are connected into the rings 42, 43 by bolts (not shown).

Within the ring 42 are located two electromagnetic coils 49, 51. These are engaged in oppositely presented annular grooves so that the ends of the electromagnet are presented in opposite axial directions respectively. Within the ring 43, moreover is a further electromagnetic coil 52.

The purpose of the electromagnetic coil 49 is to actuate a clutch mechanism for connecting the work spindle 16 with the gear ring 24 to produce a predetermined speed of rotation of the work spindle 16. The gear 24 is mounted on journal and thrust bearings 53 upon the work spindle 16. The gear 24 carries a cylindrical extension 54 which is externally slotted to engage a number of clutch plates 55. The clutch plates can co-operate with further alternating clutch plates 56 located in slots in a member 64, to be described. Within a clutch sleeve 57 at one end is an adjusting ring 58 which forms an abutment for the plates 55, 56. The adjusting ring 58 is engaged in the clutch sleeve 57 by means of a screw thread 59. The clutch sleeve 57 has an internally extending side annular flange 61 located adjacent to the face of the fixed ring 42 in which the electromagnetic coil 49 is housed. In the clutch sleeve 57 adjacent the flange 61 thereof is a ring of spaced radial holes 62.

Located in one of the holes 62 is a spring loaded plunger 63 occupying a radial hole in a member 64. This member 64 comprises a sleeve with an externally extending flange at one end. It is in this flange that the spring loaded plunger 63 is located. The sleeve portion of the member 64 is moreover slotted to accept a generally rectangular key 65 which engages in a key way in the external surface of the work spindle 16. Spacers 66, 67 engaged on the work spindle 16 locate the member 64 against axial movement relatively to the work spindle 16. The spacer 66 engages against the adjacent bearing 53 on which the gear 24 is journalled.

The flange of the member 64 provides an axially presented surface against which the adjacent one of the plates 56 engages. There are shrouded compression springs 68 acting between the surfaces of the adjusting ring 58 and of the flange of the member 64 presented towards one another. The purpose of the spring 68 is to maintain maximum possible separation between the adjusting ring 58 and the flange of the member 64 so that normally rotation between the clutch sleeve 57 and the gear 24 may take place. Since the clutch sleeve 57 is non-rotatably connected to the member 64, by means of the spring loaded plunger 63, relative rotation is thus permitted between the work spindle 16 and the gear 24. Member 64 has an annular extension which receives clutch plates 56 in slots therein.

If however it is desired to rotate the work spindle by means of the gear 24 the electromagnetic coil 49 in the ring 42 is energised. This attracts the thick flange 61 of the clutch sleeve 57 thus compressing the clutch plates 55, 56 between the inwardly presented faces of the adjusting ring 58 and the flange of the member 64. Upon de-energisation of the electro magnetic coil 49 the clutch plates are again separated under the influence of the springs 68.

To establish proper adjustment between the clutch plates 55, 56 it is sometimes necessary to adjust the position of the adjusting ring 58 in relation to the clutch sleeve 57. This is accomplished by depressing the plunger 63 and rotating the clutch sleeve 57 relatively to the clutch plates and the adjusting ring 58 until the correct clearance is obtained. In practice there is maintained a small clearance between the flange 61 of the clutch sleeve 57 and the adjacent face of the fixed ring 42, even when the electro magnetic coil 49 is in an energised condition.

The electro magnetic coil 51 is part of a brake means and this is of similar form to the clutch mechanism already described.

A member 69 has at its end remote from the member 64 a lengthwise slotted external annulus. In the slots engage a set of clutch plates 71 alternating with further plates 72 located in a part 79 having slots 83 to receive the plates. Part 79 is surrounded by a sleeve 73 engaged in one end of which is an adjusting ring 74. This is engaged like the adjusting ring 58 in the clutch sleeve 57 by means of a screw threaded connection 75.

The clutch sleeve 73 has a thick flange 76 and adjacent this is a ring of radial holes 77. Engaged in one of the holes 77 is a spring loaded plunger 78 which is contained in a radial recess in part 79. Part 79 is secured by bolts 81 to the fixed ring 42. Springs 82 are located in respective axial holes in the fixed ring 42 the outer ends of these bearing upon the clutch sleeve 73. The springs 82 surround the electro magnetic coil 51 and act in a direction opposite to that induced when the electro magnetic coil 51 is energised.

To operate the brake means to lock the work spindle 16 in any angular position in relation to the spindle drum extension 14a, the electro magnetic coil 51 is energised. This attracts the thick flange 76 of the clutch sleeve 73 to compress the clutch plates 71, 72 between the adjusting ring 74 and a surface on the part 79 secured to the fixed ring 42. Since the clutch plates 71 are engaged with the member 69 which is in turn connected to the work spindle 16 this causes the work spindle to be locked in relation to the fixed ring 42. Upon de-energisation of the electro magnetic coil 51, the springs 82 move the clutch sleeve 73 away from the adjacent face of the fixed ring 42.

The electro magnetic coil 52 in the other fixed ring 43 is used to select an alternative speed ratio for the work spindle 16 and the clutch mechanism is similar to the mechanism for connecting the gear 24 with the work spindle 16.

Contained within the fixed ring 43 is a roller bearing 84, in which the work spindle 16 is journalled. This forms an abutment for the further spacer 67.

Mounted upon the work spindle 16 at its rear end is a further thrust and journal bearing assembly 85, similar to that indicated at 53. On this is mounted the gear 25. Gear 25 has a cylindrical extension 86 which is externally slotted to engage a first set of clutch plates 87. Alternating with these is a further set of clutch plates 88 which are engaged in a member 95 having a number of slots to locate them. A clutch sleeve 89 surrounding this is provided with a thick flange 91 and spaced radial holes 92, one of which is occupied by a spring loaded plunger 93. The clutch sleeve 89 has engaged in its end, remote from the flange 91, an adjusting ring 94. Member 95 which is keyed by a key 96 to the work spindle 16 has a flange containing the plunger 93. The electromagnetic coil 52 is adjacent to the flange 91 of the clutch sleeve 89 and the energisation of this causes the clutch plates 87, 88 to be comprised against the action of compression spring 97 thus engaging the gear 25 with the work spindle 16.

The associated electrical control is however, such that it is never possible for both the clutch mechanisms associated with the gears 24 and 25 to be activated simultaneously.

Other configurations of clutch and brake units can be used, for example, one clutch and one brake may be used in a single speed machine.

I claim:

1. A spindle drive for a multi-spindle lathe having a body, a drum indexible in the body about an axis of a spindle assembly and a plurality of work spindles rotatably mounted in said drum, said drive having separate drive members for each spindle and electrically operable clutch mechanisms between the respective drive members and spindles, each clutch mechanism comprising a part fixed with respect to the spindle it is to drive and a part fixed with respect to the respective drive member, electromagnetic means fixedly mounted in a ring secured to the drum and indexible with the drum in which the spindles are rotatably mounted, clutch plates carried by said parts respectively and movable by said electromagnetic means to be engaged or disengaged, a source of electrical supply, electrical wiring connecting said electromagnetic means respectively to said source of electrical supply, a tube through which only said electrical wiring extends, said tube being an innermost element of said spindle and being indexible with said drum and coaxial with the axis about which said drum is indexed, one end of said tube remote from said drum having a rotary, electrical distributor with a portion fixed to the body of the lathe and a portion carried on said tube, said distributor providing electrical connections between said wiring and said source of electrical supply and a hollow drive shaft for said drive members, said drive shaft surrounding said tube.

2. A spindle drive as claimed in claim 1 in which a number of clutch mechanisms and a brake mechanism are provided for each of the spindles of the lathe.

3. A spindle drive as claimed claim 1 in which the electromagnetic means are coils mounted in the rings secured to the spindle drum, said coils occupying axially presented annular grooves in said rings disposed adjacent to the associated parts.

4. A spindle drive as claimed in claim 1 in which the rotary distributor is disposed near the opposite end of the lathe from the drum and has fixed connections leading through a control device to said source of electrical supply.

5. A spindle drive as claimed in claim 1 in which the wiring is connected to the electromagnetic means through connector blocks mounted on the drum.

* * * * *